UNITED STATES PATENT OFFICE.

RAYMOND F. BACON, OF PITTSBURGH, PENNSYLVANIA, ASSIGNOR TO METALS RESEARCH COMPANY, OF NEW YORK, N. Y., A CORPORATION OF MAINE.

METHOD OF MAKING SOLUBLE SULFIDS.

1,310,151.     Specification of Letters Patent.    Patented July 15, 1919.

No Drawing.     Application filed November 10, 1915. Serial No. 60,699.

*To all whom it may concern:*

Be it known that I, RAYMOND F. BACON, a citizen of the United States, residing in the city of Pittsburgh, county of Allegheny, State of Pennsylvania, have invented certain new and useful Improvements in Methods of Making Soluble Sulfids; and I do hereby declare the following to be a full, clear, and exact description of the invention, such as will enable others skilled in the art to which it appertains to make and use the same.

It has been heretofore proposed to effect the flotation and separation of oxidized ores (such as copper oxid and copper carbonate) from the gangue with which they are associated by first converting the oxidized ores, in a finely divided condition, wholly or superficially into sulfids, by the action of a soluble sulfid, and then subjecting the ore to any of the familiar processes for effecting the separation of sulfids from gangue.

The localities in which the flotation processes are practised are frequently remote from manufacturing and distributing centers, and, for this and other reasons, it is of importance to have available at the flotation plant, which is usually situated in a mining region, an economical and feasible source of supply of the soluble sulfid required.

The present invention is designed particularly to meet this requirement, and involves the production of the soluble alkaline sulfid for the sulfidizing operation from materials that are usually present in cheap and available form in the localities where mining operations are being carried on.

In the practice of the invention I may make use of the natural alkali and alkaline earth materials available in mining regions, such as lime, and the hydroxids, carbonates, and borates of the alkali or alkaline earth metals. With this cheap source of alkali, I may associate insoluble metal sulfids such as sulfid ores or concentrates, as, for instance, iron pyrites, copper pyrites, flotation concentrates, and the like, thereby obtaining a convenient and economical source of sulfur.

An appropriate quantity of any one or more of the group of alkali sources is then mixed with an appropriate quantity of any one or more of the sulfur sources. The ingredients of the mixture are preferably reduced to a fine state of subdivision, so as to obtain a correspondingly intimate intermingling of the particles, and are charged into an externally heated retort or muffle.

In the retort or muffle, or prior to their introduction therein, the ingredients are subjected, in the first instance, to a temperature lower than the heat of reaction at which the soluble sulfid is produced, for the purpose of driving off any moisture contained in the charge and also for the purpose of driving off any water of crystallization present. Thereafter, the mixture is raised to a red heat (say 600° to 700° C.) in a reducing or other non-oxidizing atmosphere whereupon they will react to form the soluble sulfid desired. If the preliminary expulsion of the moisture and water of crystallization is carried out in the muffle or retort itself, as preferred, provision should be made for removing the water vapor before the sulfid reaction temperature is reached, as will be readily understood.

The soluble sulfid resulting from the operation described can be made available by extracting it by means of leaching water, which solution can then be used for the sulfidizing of the oxidized ore; or the material containing the soluble sulfid can be itself introduced into the water of the sulfidizing tank, and the soluble sulfid then taken in solution by the sulfidizing water *in situ*.

A characteristic advantage of the invention is, as hereinbefore indicated, that from materials readily available at the mine, the operator is enabled to cheaply and conveniently make up a sulfidizing liquid utilizable, as such, for the sulfidizing of the oxidized ore to be separated by flotation, without undergoing the expense of obtaining the soluble sulfid from distant points and without being obliged to recover it in solid form from the product of the furnace operation.

What I claim is:

1. The method of making soluble sulfids from insoluble metal sulfids, such as sulfid ores and concentrates, which comprises preliminarily heating a mixture of such sulfids and alkaline material in a finely divided and intimately commingled condition, to a temperature sufficient to substantially expel the moisture and water of hydration therefrom, maintaining such temperature until all moisture and water of hydration is expelled, removing the water vapor, and subsequently raising the temperature sufficiently to cause materials to react to form a water soluble sulfid.

2. The method of making soluble sulfids from insoluble metal sulfids, such as sulfid ore and concentrates, which comprises preliminarily heating a mixture of such sulfids and alkaline material in a finely divided and intimately commingled condition to a temperature sufficient to substantially expel the moisture and water of hydration therefrom, removing the water vapor thus expelled, and subsequently raising the temperature, in a non-oxidizing atmosphere, sufficiently to cause the materials to react to form a water soluble sulfid.

In testimony whereof I affix my signature.

RAYMOND F. BACON.